United States Patent [19]

Jicha et al.

[11] 4,159,636
[45] Jul. 3, 1979

[54] METHOD FOR CONTINUOUSLY MONITORING THE CLEARANCES IN ROTATING EQUIPMENT BY FLOW MEANS

[75] Inventors: Jan Jicha; Karel Kopecek, both of Brno; Bretislav Langer, Zebetin, all of Czechoslovakia

[73] Assignee: Prvni Brnenska strojirna, narodni podnik, Brno, Czechoslovakia

[21] Appl. No.: 895,599

[22] Filed: Apr. 12, 1978

[30] Foreign Application Priority Data

Apr. 16, 1977 [CS] Czechoslovakia ............... 2513/77

[51] Int. Cl.² ............................................. G01B 13/12
[52] U.S. Cl. .................................................... 73/37.6
[58] Field of Search ............................... 73/37.6, 37.5

[56] References Cited
U.S. PATENT DOCUMENTS 3,754,433 8/1973 Hyer ..................................... 73/37.6

FOREIGN PATENT DOCUMENTS 1160652 1/1964 Fed. Rep. of Germany ............ 73/37.6

Primary Examiner—Richard C. Queisser
Assistant Examiner—Joseph W. Roskos
Attorney, Agent, or Firm—Burgess, Ryan and Wayne

[57] ABSTRACT

An apparatus for continuously monitoring clearances between a moving and a stationary machine part, utilizing compressible fluid flow. A measuring nozzle is disposed in the clearance space, and a conduit connects said nozzle with a space having a compressible fluid pressure different from the pressure in the clearance space. A measuring orifice is disposed along the conduit path. First and second comparison nozzles are situated in a pressure chamber and coupled through conduits to the same pressure space as that to which the conduit of the measuring nozzle is coupled. Measuring orifices are also situated in the conduits coupled to the comparison nozzles. Differential pressure meters are coupled between the conduit of the measuring nozzle and a conduit of one of the comparison nozzles; and between the conduits of the two comparison nozzles. The readings of the differential pressure meters are functions of both pressure variations in the clearance space and the clearance dimension, and the clearance dimension can be determined by processing the meter readings.

2 Claims, 1 Drawing Figure

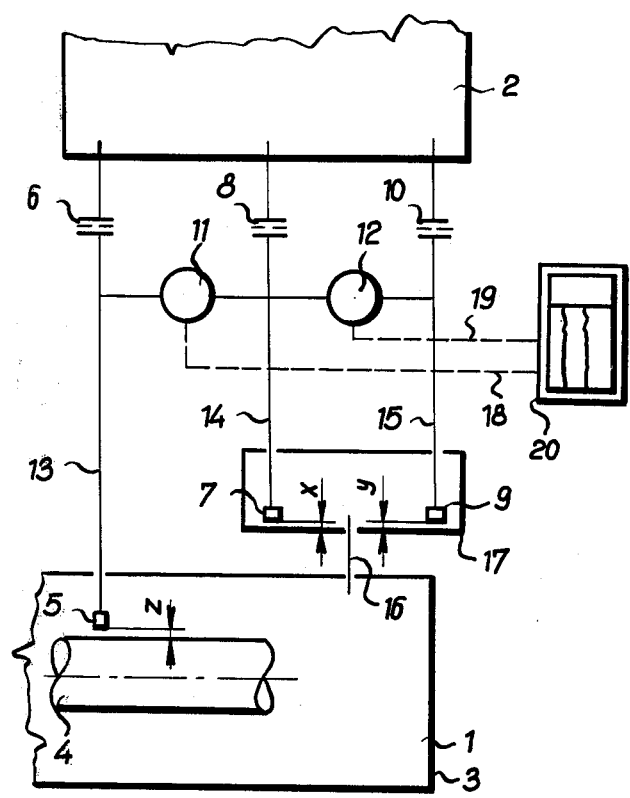

METHOD FOR CONTINUOUSLY MONITORING THE CLEARANCES IN ROTATING EQUIPMENT BY FLOW MEANS

The invention relates to an apparatus and method for the continuous monitoring of clearances, gaps and feeds between bodies, more particularly, the clearances, gaps and the feeds between rotors and stators of rotary machines. It is important to monitor the running clearances in machines having rotating members to prevent contact between the rotating and stationary parts and to prevent damage to the machine.

The method and apparatus is also useful for monitoring the running clearances in rotating machines which are operating at high temperatures, where changes of operating mode are accompanied by large changes of temperature as well as considerable thermal deformation.

A method for monitoring the thermal deformation of turbines is disclosed in West German Pat. No. 821,631. In the method disclosed in the West German patent a scanning nozzle is installed in the turbine casing opposite the rotor. The scanning nozzle is connected through interconnecting piping, on which a pressure gauge is attached, to the orifice plate. A compressive medium, such as steam, is supplied to the orifice and flows through the orifice plate, interconnecting piping, scanning nozzle and clearance between the scanning nozzle and rotor into the turbine. Changing clearances between the scanning nozzle and the rotor, changes the pressure in the interconnecting piping. The pressure change corresponding to a change in clearance is measured with the attached pressure gauge. The method is useful in monitoring operations which are carried out with steam of constant pressure and temperature. When the parameters of the steam supply are changed, it is impossible to determine the clearance directly. It is necessary to calculate the clearance by means of complicated methods from established pressures and the other parameters of the apparatus.

Another known method for monitoring the axial movement of rotors in turbine stators uses a double system, consisting of two measuring branches, each of which has a scanning nozzle, interconnecting piping, and an orifice plate. A differential pressure gauge is connected between the interconnecting piping of both branches. The axial movement of the rotor is measured in relation to a ring fixed on the rotor. Scanning nozzles mounted on the stator are located on both sides of the ring. During axial movement of the rotor, the clearance between the scanning nozzles and the ring changes so that with one scanning nozzle the clearance is decreased and with the other nozzle, the clearance is enlarged. The change in clearance between the rotating and stationary turbine parts is evaluated by the pressure difference in the interconnecting piping. With a change in the parameters of the flowing medium, it is necessary to do a complex reduction to evaluate the change in clearances.

To simplify the evaluation of the changes in clearance with changes of the parameters of the flowing medium, a computer can be used to carry out a continuous reduction. According to the West German Patent Application No. 1,160,652 for example, to the above-mentioned apparatus is attached a second differential pressure gauge, connected to the pressure at the scanning nozzles and the pressure behind the orifice plate. The second differential pressure gauge measures the overall pressure drop of the flowing medium in the measuring branch. Analog signals of the first differential pressure gauge, which measures the pressure difference in the interconnecting piping due to the clearance between the scanners and the rotor are together with analog signals of the second differential pressure gauge, which measures overall pressure drop, conveyed to the computer which evaluates the clearance. The method is very inaccurate, because it does not include the effect of the temperature of the flowing medium. It is also known that a compensating method for measuring the clearance and the feeds according to the Czechoslovak Patent Application PV 2468-72 can be used. The method disclosed in Application PV 2468-72 consists of two branches. In this method a scanning branch consisting of a scanning nozzle, placed in the scanning space is attached through interconnecting piping to a first orifice plate. The compensating branch consists of a compensating nozzle, placed in an adjustable fixture attached through interconnecting piping to a second orifice plate. Between the interconnecting piping of both branches is connected a differential pressure gauge. The clearance is measured by taking the compensating pressure difference to zero-value by adjustment of the compensating clearance of the compensating nozzle. The clearance which is measured is then the same as the compensating clearance. The disadvantage of this method is the necessity of continuously equalizing the pressure differences to zero-value. In cases where it is necessary to continuously monitor the measured clearance it is necessary to attach complicated equipment to the apparatus.

According to the invention there is provided an apparatus and method for continuously measuring by flow means the clearances, gaps and feeds between a moving member and a stationary member of an apparatus having moving parts, which comprises three paths for compressible fluid flow between a first pressure area between the moving part, whose clearance is to be monitored and the stationary part, to a second pressure area, said first flow path comprising a first measuring nozzle mounted on the stationary part with its orifice facing the moving part, a first conveying means connected to said first measuring nozzle for conveying the compressible fluid between the first pressure area to said second area said first conveying means having a first measuring orifice mounted therein between the measuring nozzle and the second pressure area and having a first side of a first differential pressure measuring means interconnected with said first conveying means between the first measuring nozzle and the first measuring orifice, a second fluid conveying means open to the fluid in the area between the moving part and the stationary part, which clearance is to be monitored; a second measuring nozzle mounted with its orifice facing in a surface and adapted to convey a portion of the fluid in said second fluid conveying means through a third fluid conveying means between the second pressure space and the first pressure space, said third fluid conveying means having connected therewith a second measuring orifice, said second side of said first differential pressure measuring means and a first side of a second differential pressure measuring means interconnected with said third fluid conveying means between said second measuring nozzle and said second measuring orifice; a third measuring nozzle mounted with its orifice facing a surface and adapted to convey a portion of the fluid in said second fluid conveying means through a fourth fluid conveying means between the second pressure space and the first pressure space, said fourth fluid conveying means having connected therewith a third measuring orifice, said second side of said second differential pressure measuring means interconnected with said fourth fluid conveying means between said third measuring nozzle and said third measuring orifice whereby the clearance between the stationary and moving parts can be measured by the differential pressures measured by the two differential pressure measuring means.

The apparatus of the present invention makes possible continuous measuring and registration of the clearance between the rotating and stationary machine parts. It is built of simple and known components and makes possible a connection of various subtracting, measuring, recording and evaluating devices.

A specific embodiment of the invention will now be described by way of example with reference to the accompanying drawing which is a schematic of an apparatus for continuously measuring the clearances between rotating and stationary steam turbine parts by flow means.

Inside the machine is stator 3 opposite rotor 4 forming pressure space 1. The measuring nozzle 5, mounted on stator 3 with its orifice a measured clearance z from the moving surface of rotor 4. The measuring nozzle 5 is interconnected through piping 13, in which is mounted measuring orifice plate 6, with the second pressure space 2. The first pressure space 1, which fills the cavity of the stator 3, is interconnected through piping 16 to pressure chamber 17. The comparison nozzles 7, 9 are adjustably mounted in pressure chamber 17, with their orifices adjustably arranged opposite one of the walls. Orifices of the comparison nozzles 7, 9 are distant from the wall comparison clearances x and y. Comparison nozzle 7 through interconnecting piping 14, in which is installed comparison orifice plate 8 is connected with the second pressure space 2. In the same way through interconnecting piping 15 in which is mounted the comparison orifice plate 10, comparison nozzle 9 is connected with the second pressure space 2. The first side of the first differential pressure measuring means 11 is connected to interconnecting piping 13 between measuring nozzle 5 and the measuring orifice plate 6. The second side of the differential pressure measuring means 11 is connected to the interconnecting piping 14, of the second branch, between comparison nozzle 7 and comparison orifice plate 8. Similarly the second differential pressure measuring means 12 is connected to the interconnecting piping 14 of the second branch between comparison nozzle 7 and comparison orifice plate 8 and to the interconnecting piping 15 between comparison nozzle 9 and comparison orifice plate 10. The converter of the signal of first differential pressure gauge 11 is, through exchange line 18 connected to the first inlet of evaluating equipment 20. In the same way the converter of the signal of the second differential pressure gauge 12 is connected through exchange line 19 to the second inlet of evaluating equipment 20.

When the first pressure space 1 is at a higher pressure than the second pressure space 2 the fluid medium flows through the measuring system into second pressure space 2, whereby the pressure ratio measured by the differential pressure measuring means 11, 12 are functions of the measured clearance z and of the comparison clearances x, y. The pressure differential on the first differential pressure gauge 11 corresponds to a difference of the measured clearance z and the comparison clearance x. Similarly the pressure differential on the second differential measuring means 12 corresponds to a difference of the comparison clearances x, y. With a stable pressure ratio between pressure spaces 1, 2, the pressure differential on the second differential pressure measuring means 12 is constant and the pressure differential on the first differential pressure measuring means 11 is a function of the measured clearance z only. The degree of change of the measured clearance z is evaluated through comparison of pressure differences on the differential pressure measuring means 11, 12. With a non-stable pressure ratio between pressure spaces 1, 2, the pressure differential is variable, but it corresponds exactly to the difference of pressures between the pressure spaces 1, 2. The pressure differential on the first differential pressure measuring means 11 is then a function of instantaneous difference of pressures between the pressure spaces 1, 2 and measured clearance z. The value of the measured clearance z is then again evaluated by comparison of the pressure differences on differential pressure measuring means 11, 12. The pressure differentials of the differential pressure measuring means 11 and 12 are transformed into analog electric signals, which are scanned and processed in evaluating equipment 20.

The apparatus for continuous flow measuring of the clearances, gaps and the feeds according to the invention works well at high and variable temperatures and pressures. For example, when using a measuring nozzle 5 with inner diameter of 5 mm there is measured and recorded clearance between the rotating and stationary machine parts in ranges from 0.2 to 1.0 mm with about a two to three percent accuracy.

The following Examples are given for purposes of illustration only and not by way of limitation.

A method for continuously monitoring according to the invention has been used in one case with an automatic device to follow a radial clearance in a high-pressure seal of a steam turbine with admission steam temperature of 565° C. and pressure 13MPa. In place of the measured clearance, the maximum steam pressure was 5.6 MPa and the steam temperature 520° C. The diameter of the measuring nozzle 5 was 5 mm and the diameter of the measuring orifice plate 6 and the comparison orifice plates 8, 10 was 5 mm too. The measured radial clearance ranged from 0.3 to 0.6 mm. The measurement range of the differential pressure measuring means 11, 12 with direct-current electric outlet ±20 mV was ±1.5 MPa.

In another case, a method according to the invention has been used for measuring of the radial clearances inside a seal of the steam turbine where the pressure of steam in the measured place was 30 kPa and temperature 120° C. The measured clearances ranged from 0.4 to 0.8 mm. The diameter of the measuring nozzle 5 was 5 mm, the diameter of the measuring orifice plate 6 and the comparison orifice plates 8, 10 were also 5 mm. The measurement range of the differential pressure measuring means 11, 12 with direct-current electric outlet ±20 mV was ±70 kPa.

It will be appreciated that the objects of the present invention have been successfully achieved. While the invention has been described by reference to illustrative preferred embodiments, it is obvious that various modifications may be made thereof within the scope of the invention which is defined by the following claims.

What is claimed is:

1. An apparatus for the continuous measurement of clearances, gaps and feeds between moving and stationary machine parts which comprises three paths for compressible fluid flow between a first pressure area between the moving part, whose clearance is to be monitored and the stationary part, to a second pressure area, said first flow path comprising a first measuring nozzle mounted on the stationary part with its orifice facing the moving part, a first conveying means connected to said first measuring nozzle for conveying the compressible fluid between the first pressure area to said second area, said first conveying means having a first measuring orifice mounted therein between the measuring nozzle and the second pressure area and having a first side of a first differential pressure measuring means interconnected with said first conveying means between the first measuring nozzle and the first measuring orifice, a second fluid conveying means open to the fluid in the area between the moving part and the stationary part, which clearance is to be monitored; a second measuring nozzle mounted with its orifice facing in a surface and adapted to convey a portion of the fluid in said second fluid conveying means through a third fluid conveying means between the second pressure space and the first pressure space, said third fluid conveying means having connected therewith a second side of said first differential pressure measuring means and a first side of a second differential pressure measuring means interconnected with said third fluid conveying means between said second measuring nozzle and said orifice of said second measuring nozzle; a third measuring nozzle mounted with its orifice facing a surface and adapted to convey a portion of the fluid in said second fluid conveying means through a fourth fluid conveying means between the second pressure space and the first pressure space, said fourth fluid conveying means having connected therewith a third measuring orifice, said second side of said second differential pressure measuring means being interconnected with said fourth fluid conveying means between said third measuring nozzle and said third measuring orifice whereby the clearance between the stationary and moving parts can be measured by the differential pressures measured by the two differential pressure measuring means.

2. The apparatus of claim 1 wherein an analog signal from said first differential pressure measuring means and an analog signal from said second differential pressure measuring means are connected to an evaluating device for determining the clearances, gaps and feeds.

* * * * *